(12) United States Patent
Kim et al.

(10) Patent No.: US 6,941,015 B1
(45) Date of Patent: Sep. 6, 2005

(54) METHOD FOR EXTRACTING ZERNIKE/PSEUDO-ZERNIKE MOMENT

(75) Inventors: Hoel Wyul Kim, Seoul (KR); Sun Kyoo Hwang, Anyang (KR)

(73) Assignee: LG Electronics Inc., Seoul (KR)

( * ) Notice: Subject to any disclaimer, the term of this patent is extended or adjusted under 35 U.S.C. 154(b) by 764 days.

(21) Appl. No.: 09/869,145

(22) PCT Filed: Oct. 27, 2000

(86) PCT No.: PCT/KR00/01226

§ 371 (c)(1),
(2), (4) Date: Jun. 26, 2001

(87) PCT Pub. No.: WO01/33480

PCT Pub. Date: May 10, 2001

(30) Foreign Application Priority Data

Oct. 27, 1999 (KR) ........................ 1999-46916

(51) Int. Cl.$^7$ ................................. G06K 9/46
(52) U.S. Cl. ..................................... 382/190
(58) Field of Search ................ 382/151, 181, 382/190, 194, 201, 206, 289, 297, 305

(56) References Cited

U.S. PATENT DOCUMENTS 6,226,417 B1 * 5/2001 Yamagata et al. .......... 382/289

FOREIGN PATENT DOCUMENTS

| JP | 09-147109 A | 6/1997 |
|---|---|---|
| JP | 09-147109 | 6/1997 |
| JP | 11-110562 A | 4/1999 |
| JP | 11-250106 A | 9/1999 |
| JP | 11-256106 | 9/1999 |
| JP | 11-257947 A | 9/1999 |

OTHER PUBLICATIONS

Eisumu, et al. "Computer Translation of Japanese Patent No. 11–250106", pp. 1–23, Sep. 1999.*
Khotanzad, et al. "Invariant image recognition by Zernike moments", IEEE, pp. 489–497, 1990.*
Bailey, et al. "Orthogonal moment features for use with parametric and non–parametric classifiers", IEEE, pp. 389–399, 1996.*

\* cited by examiner

*Primary Examiner*—Daniel Miriam
(74) *Attorney, Agent, or Firm*—Fleshner & Kim, LLP

(57) ABSTRACT

The present invention relates to a method for extracting a Zernike/Pseudo-Zernike moment, and in particular, to a method for extracting a Zernike/Pseudo-Zernike moment by using the symmetry of a Zernike/Pseudo-Zernike moment basis function and computer readable recording medium on which a program implementing the same method is recorded. The method of the invention includes the steps of: generating a Zernike/Pseudo-Zernike moment in a predetermined quadrant on plane Cartesian coordinates; obtaining a pixel value of the input image by projecting the input image onto the quadrant; and multiplying each pixel value of the input image by the moment basis function corresponding to the pixel position and then summing the results thereof. Therefore, it is possible to extract a Zernike/Pseudo-Zernike moment in real time. In addition, system loads can be reduced more substantially by decreasing memory utilization during moment extraction to ¼, as compared to the conventional art.

15 Claims, 6 Drawing Sheets

METHOD FOR EXTRACTING ZERNIKE/ PSEUDO-ZERNIKE MOMENT

This application claims priority to PCT/KR00/01226, filed Oct. 27, 2000, which claimed priority to Korean Patent Application No. 46916/1999, filed Oct. 27, 1999.

TECHNICAL FIELD

The present invention relates to a method for extracting a Zernike/Pseudo-Zernike moment, and in particular, to a method for extracting a Zemike/Pseudo-Zernike moment by using the symmetry of a Zernike/Pseudo-Zernike moment basis function and computer readable recording medium on which a program implementing the same method is recorded.

BACKGROUND ART

In the conventional art, since a Zernike/Pseudo-Zernike moment includes an orthogonal basis function, it shows the characteristics of an image more efficiently than a geometric moment, Legendre moment, rotational moment and the like. On the contrary, a method for extracting a Zernike/Pseudo-Zernike moment has the following problem.

The method for extracting a Zernike/Pseudo-Zernike moment according to the conventional art includes the method for storing the result of repeated calculations on a look-up table and using the stored result in extracting a moment.

However, the above method used in extracting a moment requires much moment extraction time, and a large amount of memory utilization necessary for memory extraction is needed in order to store the look-up table.

On the other hand, another conventional method includes an approximation method for approximating a Zernike/Pseudo-Zernike moment basis function in a square shape.

However, the above method has a problem that it is impossible to extract an accurate moment for an image, though a moment extraction speed can be increased.

DISCLOSURE OF THE INVENTION

Therefore, it is an object of the present invention to provide a method for extracting a Zernike/Pseudo-Zernike moment by using the symmetry of a Zernike/Pseudo-Zernike moment basis function for the purposes of rapid moment extraction and decrease in memory utilization and computer readable recording medium on which a program implementing the same method is recorded.

It is another object of the present invention to provided a method for extracting a Zernike/Pseudo-Zernike moment by using the symmetry of a Zernike/Pseudo-Zernike moment basis function.

In order to achieve the above-described objects of the present invention, there is provided a method for extracting a Zernike/Pseudo-Zernike moment for an input image according to the present invention, which includes the steps of: generating a Zernike/Pseudo-Zernike moment in a predetermined quadrant on a plane cartesian coordinates; obtaining a pixel value of the input image by projecting the input image onto the quadrant; and multiplying each pixel value of the input image by the moment basis function corresponding to the pixel position and then summing the results thereof.

In addition, there is provided a method for extracting a Zernike/Pseudo-Zernike moment for an input image according to the present invention, which includes the steps of: generating a Zernike/Pseudo-Zernike moment in a predetermined quadrant on a plane orthogonal coordinates; generating a Zernike/Pseudo-Zernike moment for all quadrants from the a Zernike/Pseudo-Zernike moment basis function on the quadrant by using the symmetry of a Zernike/Pseudo-Zernike moment; obtaining a pixel value of the input image; and multiplying each pixel value of the input image with the moment basis function corresponding to the pixel position and then summing the results thereof.

In addition, there is provided a computer readable recording medium on which a program implementing the same method is recorded, which includes the functions of: generating a Zernike/Pseudo-Zernike moment in a predetermined quadrant on a plane orthogonal coordinates in an image recognition system having a processor in order to extract a Zernike/Pseudo-Zernike moment; obtaining a pixel value of the input image by projecting the input image onto the quadrant; and multiplying each pixel value of the input image with the moment basis function corresponding to the pixel position and then summing the results thereof.

In addition, there is provided a computer readable recording medium on which a program implementing the same method is recorded, which includes the functions of: generating a Zernike/Pseudo-Zernike moment in a predetermined quadrant on a plane orthogonal coordinates in an image recognition system having a processor in order to extract a Zernike/Pseudo-Zernuke moment; generating a Zernike/Pseudo-Zernike moment for all quadrants from the a Zernike/Pseudo-Zernike moment basis function on the quadrant by using the symmetry of a Zernike/Pseudo-Zernike moment; obtaining a pixel value of the input image; and multiplying each pixel value of the input image with the moment basis function corresponding to the pixel position and then summing the results thereof.

Additional advantages, objects, and features of the invention will become more apparent from the description which follows.

MODES FOR CARRYING OUT THE PREFERRED EMBODIMENTS

The preferred embodiment of the present invention will now be described with reference to the accompanying drawings.

Figure 1:
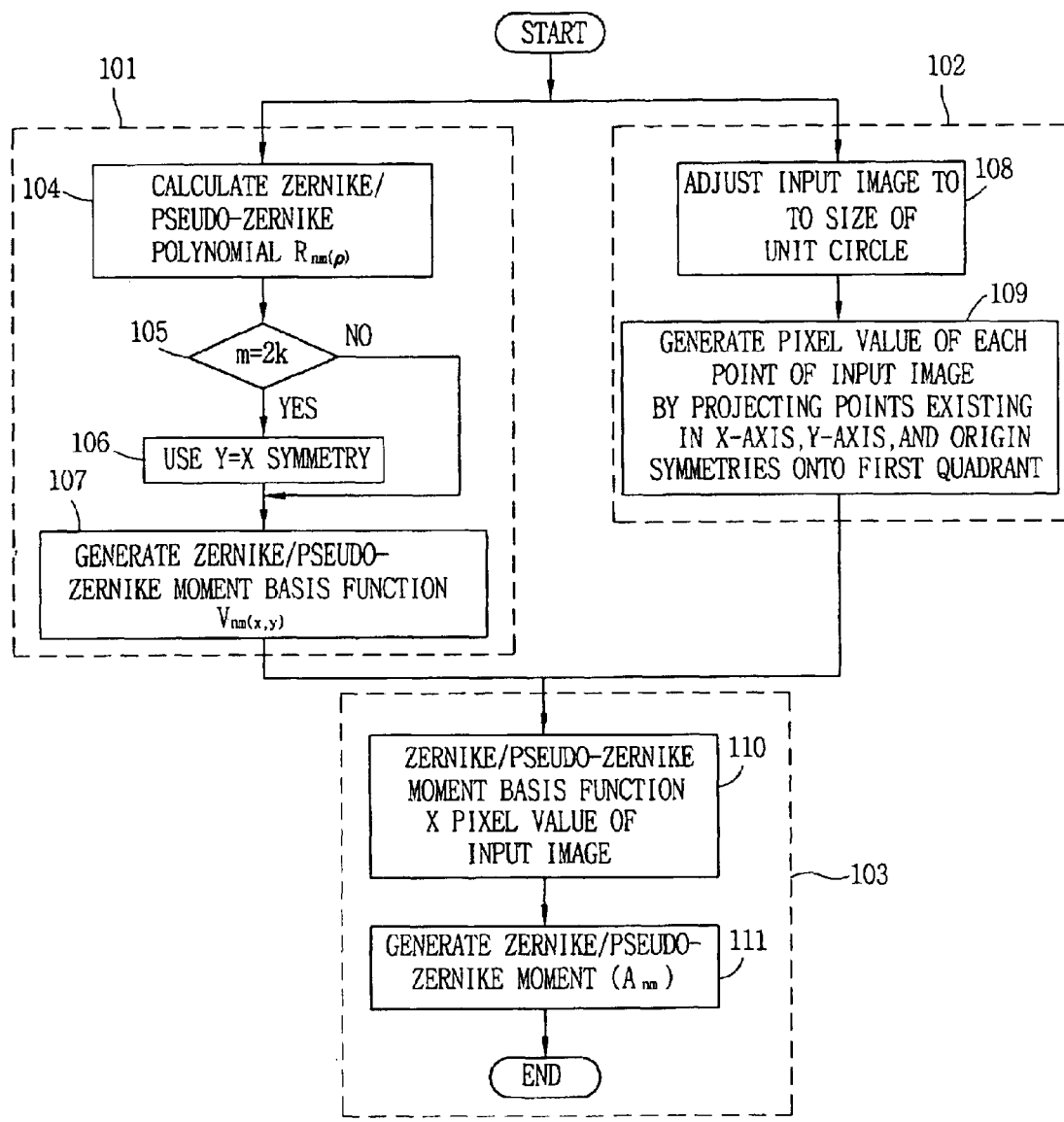
FIG. 1 is a flow chart illustrating a method for extracting a Zernike/Pseudo-Zernike moment according to a first embodiment of the present invention.

FIG. 1 is a flow chart illustrating a method for extracting a Zernike/Pseudo-Zernike moment according to a first embodiment of the present invention.

As illustrated therein, the method for extracting a moment includes the steps of: obtaining a Zernike/Pseudo-Zernike moment basis function in a first quadrant in step 101; obtaining a pixel value an input image in step 102; and extracting a Zernike/Pseudo-Zernike moment by multiplying the moment basis function with the pixel value of the input image in step 103.

The step 101 of obtaining a Zernike/Pseudo-Zernike moment basis function in a quadrant will now be described.

First, the real radial polynomial of a Zernike moment and the real radial polynomial of a Pseudo-Zernike moment are obtained by using mathematical formulas 1 and 2 in step 104.

Sine the real radial polynomial of the Zernike/Pseudo-Zernike moment is orthogonal in a unit circle of $x^2+y^2=1$, information redundancy is small.

The real radial polynomial Rnm'($\rho$) of the Zernike moment is expressed by mathematical formula 1.

[Mathematical Formula 1]

$$Rnm(\rho) = \sum_{s=0}^{(n-m)/2} (-1)^s \frac{(n-s)!}{s!\left(\frac{n+|m|}{2}-s\right)!\left(\frac{n-|m|}{2}-s\right)!} \rho^{(n-2s)}$$

In addition, the real radial polynomial Rnm($\rho$) of the Pseudo-Zernike moment is expressed by mathematical formula 2.

[Mathematical Formula 2]

$$Rnm(\rho) = \sum_{s=0}^{n=m} (-1)^s \frac{(2n+1-s)!}{s!(n-m-s)!(n-m+1-s)!} \rho^{(n-s)}$$

Here, n is an order, m is a repetition, and n and m must satisfy n−|m|=even number and |m|≦n.

It is checked if the repetition(m) is an even number, i.e., m=2k in step 105. If the repetition(m) is an even number, a Zernike/Pseudo-Zernike basis function is obtained in step 107 by using y=x symmetry in step 106.

A Zernike/Pseudo-Zernike basis function with an order of n and a repetition of m is expressed by mathematical formula 3.

[Mathematical Formula 3]

$$Vnm(x,y)=Rnm(\rho)e^{jm\Theta}=Rnm(\rho)cosm\Theta+jRnm(\rho)sinm\Theta=\text{real part}+j\text{ imaginary part}$$

Here, with respect to Vnm(x,y), the polynomial Rnm($\rho$) is multiplied by $e^{jm\Theta}$, $e^{jm\Theta}$ term is transformed into (cosm$\Theta$+j sinm$\Theta$) by using Fourier Formula.

Here, the cos term and the sin term have a specific symmetry in a Cartesian coordinate system, Vnm(x,y) also has a specific symmetry (refer to FIGS. 4A through 5B).

The step of obtaining a pixel value of an input image in step 102 will now be explained below(refer to FIGS. 6A and 6B).

The pivot point of the input image is calculated to be adjusted to a unit circle size in step 108. Then, the pixel value of each point is obtained by projecting points existing in a fourth quadrant, second quadrant, and third quadrant by using x-axis symmetry, y-axis symmetry, and origin symmetry in step 109.

Here, the reason why the input image is adjusted to the size of a unit circle centering on the origin is that a Zernike/Pseudo-Zernike moment basis function is orthogonal in the unit circle.

The step of extracting a Zernike/Pseudo-Zernike moment by multiplying the moment basis function by a pixel value of an input image in step 103 will now be explained as follows.

Figure 6A:
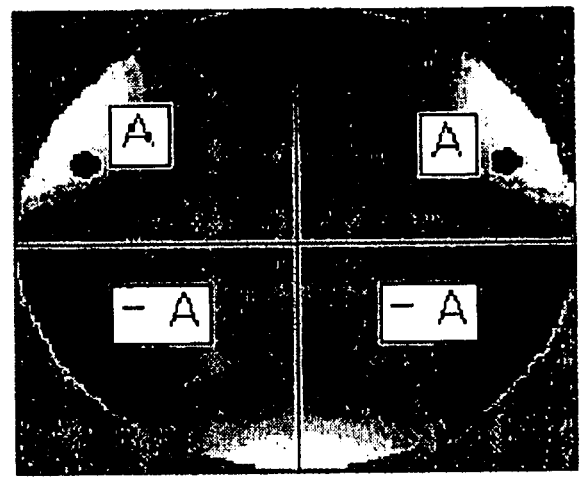
FIGS. 6A and 6B are explanatory views of Zernike moment extraction from an input image.
Figure 6B:
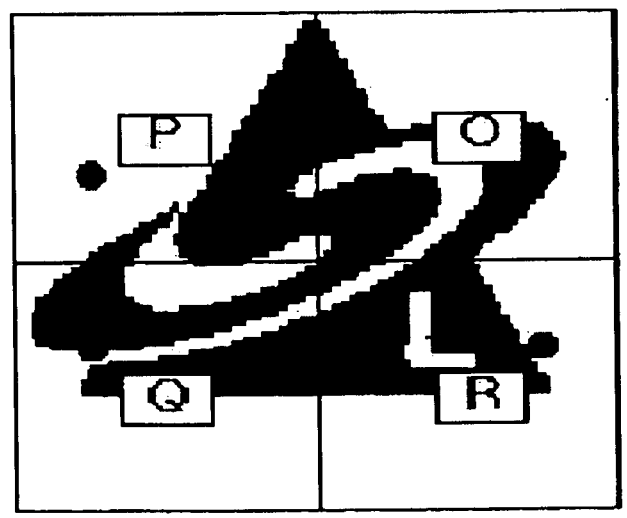

The Zernike/Pseudo-Zernike moment is obtained by multiplying each moment basis function by the pixel value of the input image in step 110, and then summing the results thereof in step 111(refer to FIGS. 6A and 6B).

This will be mathematically expressed by Mathematical Formula 4, and the Zernike/Pseudo-Zernike moment is a complex number.

[Mathematical Formula 4]

$$Anm = \frac{n+1}{k}\sum_x\sum_y f(x,y)Vnm*(x,y)$$

Here, * represents a complex conjugate.

Generally, the Zernike/Pseudo-Zernike moment is considered the projection of the Zernike/Pseudo-Zernike basis function of the input image(refer to FIGS. 6A and 6B).

Figure 2:
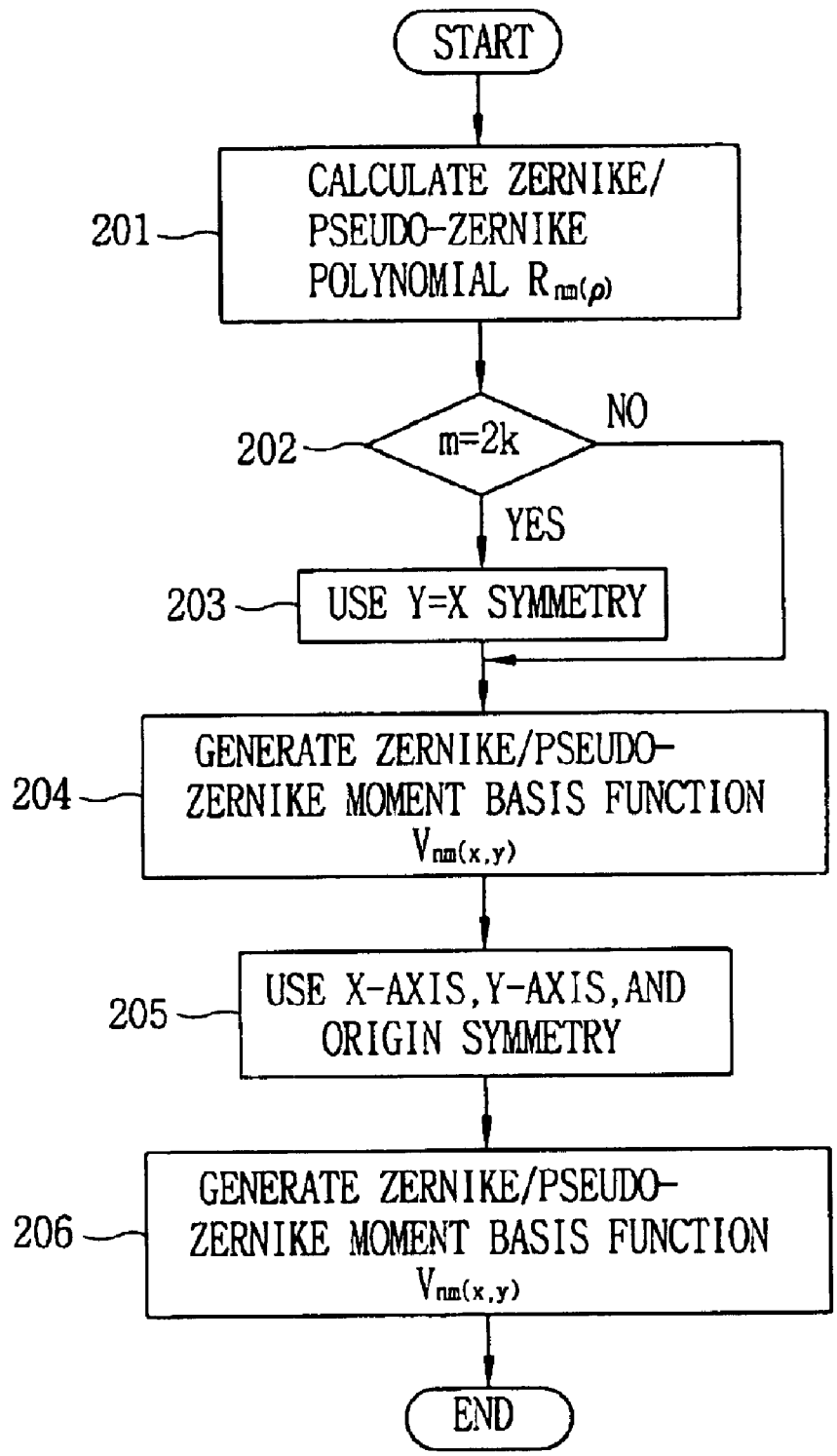
FIG. 2 is a flow chart illustrating a method for generating a Zernike/Pseudo-Zernike moment according to a second embodiment of the present invention.

FIG. 2 is a flow chart illustrating a method for generating a Zernike/Pseudo-Zernike moment according to a second embodiment of the present invention.

As illustrated therein, the step of generating a Zernike/Pseudo-Zernike moment basis function in a first quadrant in steps 201 through 204 is the same as step 101 of FIG. 1.

In addition, the Zernike/Pseudo-Zernike moment basis function in the remaining second, third, and fourth quadrants is obtained by applying x-axis symmetry, y-axis symmetry, and origin symmetry to the Zernike/Pseudo-Zernike moment basis function in the first quadrant as obtained in steps 201 through 204.

Moreover, unlike FIG. 1, the pixel value of the input image is obtained for all the four quadrants without projecting the input image onto the first quadrant. Then, each pixel value is multiplied by the Zernike/Pseudo-Zernike moment basis function corresponding to the position of the pixel, and then the results thereof are added, thereby obtaining the Zernike/Pseudo-Zernike moment for the input image.

Figure 3:
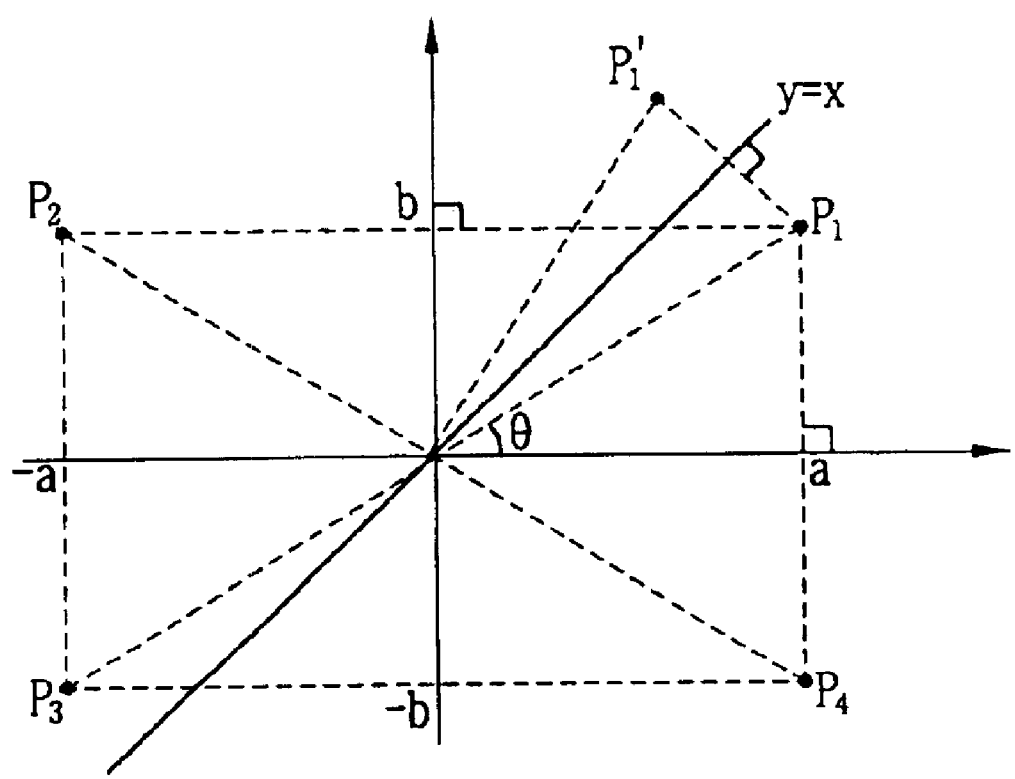
FIG. 3 is a view explaining symmetry with y=x, x-axis, y-axis, and origin.

FIG. 3 is a view explaining symmetry with y=x, x-axis, y-axis, and origin.

As illustrated therein, the symmetric points of a point P1(a,b) existing in the Cartesian coordinate system includes the symmetric point of x-axis, symmetric point of y-axis, symmetric point of the origin, and symmetric point of y=x.

The coordinates and phase angles of the symmetric points in the Cartesian coordinate system are shown in Table 1.

In obtaining Vnm(x,y) in the coordinates disposed in the symmetric points, the symmetry of cosm$\theta$ and sinm$\theta$ is very important. Here, θ represents the angle between each point and a horizon line.

TABLE 1

| Reference for symmetric point | coordinate | θ = tan⁻¹ (y/x) |
|---|---|---|
| Reference point | P1 = (a, b) | θ |
| y-axis symmetry | P2 = (−a, b) | π − θ |
| Origin symmetry | P3 = (−a, −b) | π + θ |
| x-axis symmetry | P4 = (a, −b) | −θ |
| Y = x symmetry | P1' = (b, a) | π/2 − θ |

Figure 4A:
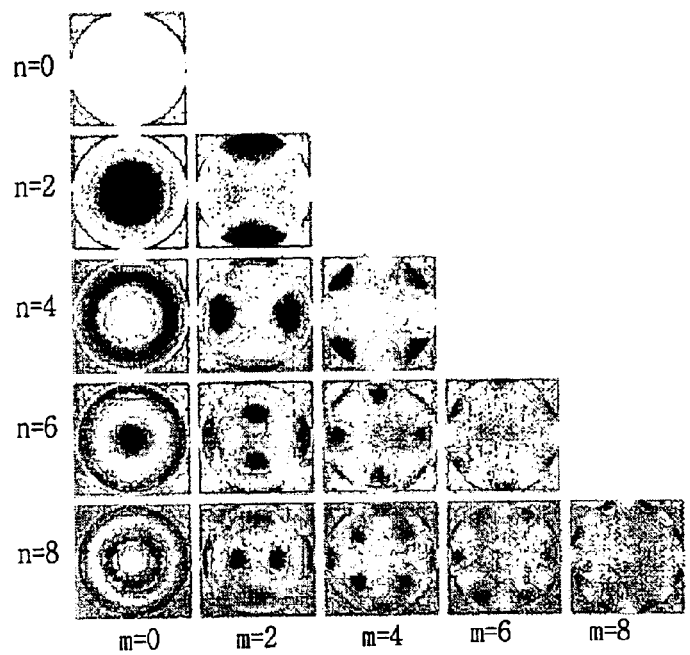
FIGS. 4A and 4B are explanatory views of a Zernike moment basis function in the case that a repetition (m) is an even number.
Figure 4B:
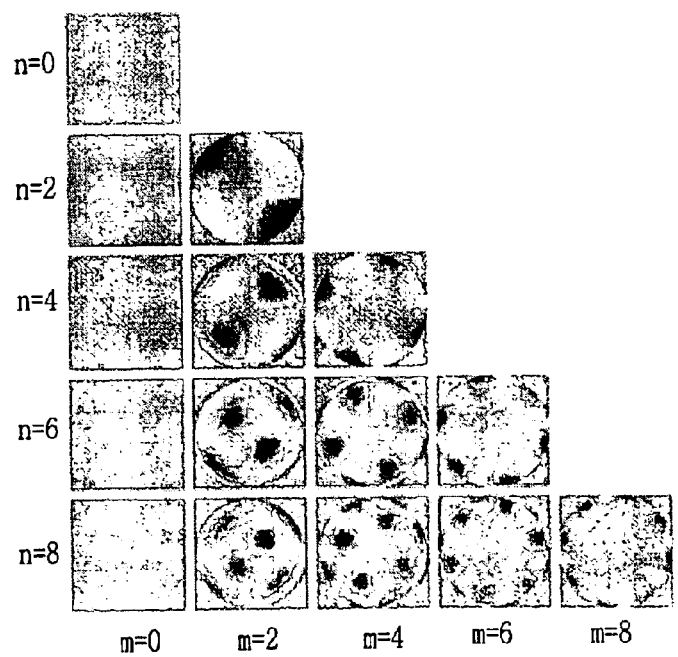

FIGS. 4A and 4B are explanatory views of a Zernike moment basis function in the case that a repetition (m) is an even number.

As illustrated therein, the shape of the Zernike moment basis function in the case that the repetition(m) is an even number is shown.

With respect to each symmetric point, like Table 1, when the angle between each point and a horizon line, i.e., θ is changed, the symmetry of $\cos m\theta$ and $\sin m\theta$ varies according to whether the repetition(m) is an even number or odd number. Here, the shape of the Zernike moment basis function in the case that the repetition(m) is an even number is explained.

FIG. 4A illustrates the real part of the Zernike moment basis function, and FIG. 4B illustrates the imaginary part of the Zernike moment basis function.

The Zernike moment basis function has a value between −1 and 1. The range of the value of the Zernike moment basis function is divided into 256 parts, in which a value close to −1 is denoted by black, while a value close to 1 is denoted by white.

As illustrated therein, the Zernike moment basis function has symmetry of a specific type for the x-axis, y-axis, and origin. Such symmetry is caused by the change in θ as shown in Table 1, which can be put in order as shown in Table 2.

TABLE 2

| Reference for Symmetric Point | Coordinate | Real part | Imaginary Part |
|---|---|---|---|
| Reference Point | P1 = (a, b) | R | I |
| y-axis Symmetry | P2 = (−a, b) | R | −I |
| Origin symmetry | P3 = (−a, −b) | R | I |
| x-axis Symmetry | P4 = (a, −b) | R | −I |

In the case that the repetition(m) is an even number, y=x also has symmetry. That is, the case of m=4k and the case of m=4k+2 has different types of symmetry.

In case of m=4k, the real part has the same value in symmetry with y=x, while the imaginary part has a value multiplied by −1.

In case of m=4k+2, both real part and imaginary part has a value multiplied by −1 in symmetry with y=x.

The above description will be also adapted to the Pseudo-Zernike moment basis function.

Figure 5A:
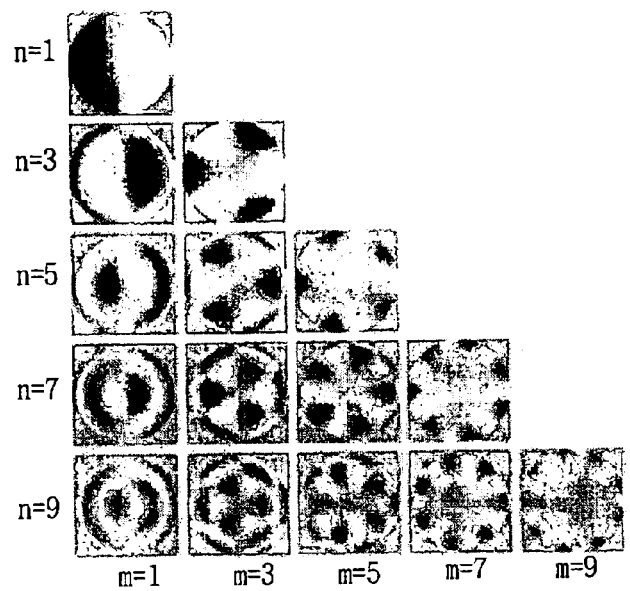
FIGS. 5A and 5B are explanatory views of a Zernike moment basis function in the case that a repetition (m) is an odd number.
Figure 5B:
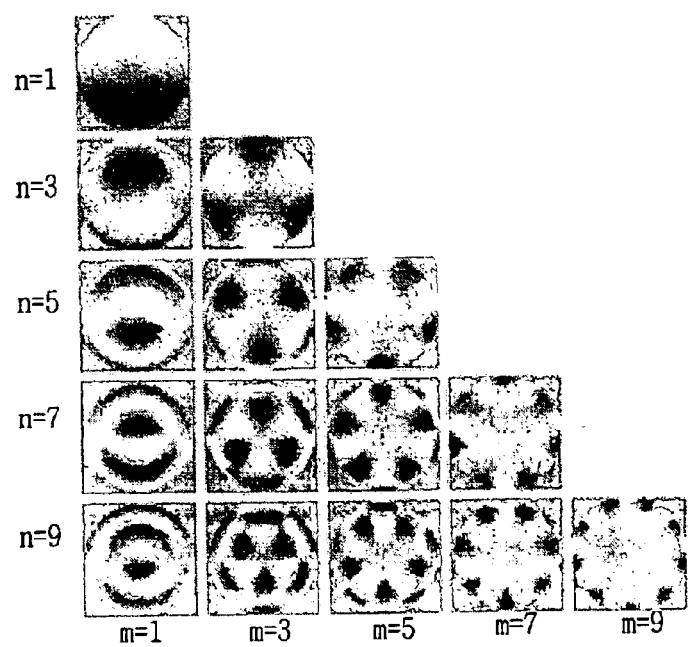

FIGS. 5A and 5B are explanatory views of a Zernike moment basis function in the case that a repetition (m) is an odd number.

As illustrated therein, the shape of the Zernike moment basis function in the case that the repetition(m) is an odd number is explained.

With respect to each symmetric point, like Table 1, when the angle between each point and a horizon line, i.e., θ is changed, the symmetry of $\cos m\theta$ and $\sin m\theta$ varies according to whether the repetition(m) is an even number or odd number. Here, the shape of the Zernike moment basis function in the case that the repetition(m) is an odd number is explained.

FIG. 5A illustrates the real part of the Zernike moment basis function, and FIG. 5B illustrates the imaginary part of the Zernike moment basis function.

The Zernike moment basis function has a value between −1 and 1. The range of the value of the Zernike moment basis function is divided into 256 parts, in which a value close to −1 is denoted by black, while a value close to 1 is denoted by white.

The symmetry in case of m=2k+1 is caused by the change in θ as shown in Table 1, which can be put in order as shown in Table 4.

TABLE 3

| Reference for symmetric point | Coordinate | Real part | Imaginary part |
|---|---|---|---|
| Reference point | P1 = (a, b) | R | I |
| Y-axis symmetry | P2 = (−a, b) | −R | I |
| Origin symmetry | P3 = (−a, −b) | −R | −I |
| X-axis symmetry | P4 = (a, −b) | R | −I |

The above description will be also adapted to the Pseudo-Zernike moment basis function.

FIGS. 6A and 6B are explanatory views of Zernike moment extraction from an input image.

As illustrated therein, FIG. 6A illustrates the imaginary part of the Zernike moment basis function in case of n=m=3, and FIG. 6B illustrates an input image adjusted to the size as in FIG. 6A.

The Zernike/Pseudo-Zernike moment is obtained by multiplying each pixel value of the input image by the Zernike/Pseudo-Zernike moment basis function corresponding to the position of the pixel and then summing the results thereof.

The method for obtaining the Zernike moment for the input image (FIG. 6B) in the first quadrant only will be described, for example, in detail.

In the case that an order is 3(n=3) and a repetition is 3(m=3), the Zernike moment is obtained by multiplying each pixel value of the input image (FIG. 6B) by the Zernike moment basis function corresponding to the position of the pixel, and summing the results thereof.

The pixel values of four points (denoted by black, round points on the drawings) having symmetry are represented as O, P, Q, and R. If the Zernike moment basis function corresponding to the position of pixel O is A, the Zernike moment basis functions corresponding to the positions of the remaining pixels P, Q, and R are A, −A, and −A, respectively, by x-axis symmetry, y-axis symmetry, and origin symmetry.

Here, with respect to the moment basis function and the pixel value of the input image, in case of binary image, black portions have a pixel value of 1, white portions have a pixel value of 0, or vice versa. On the other hand, in case of grayscale image, the pixel value is recognized a value between 0 and 255.

At this time, the Zernike moment (A33) for the input image is obtained by [Mathematical Formula 5]

Zernike moment (A33)=0*(A)+P*(A)+Q*(−A)+R*(−A)

If Mathematical Formula 5 is changed to Mathematical Formula 6, the number of multiply operations is reduced from 4 to 1.
[Mathematical Formula 6]

Zernike moment (A33)=(0+P−Q−R)*A

In Mathematical Formula 6, the operation of (O+P−Q−R) means that the second, third, and fourth quadrants are projected onto the first quadrant.

Mathematical Formula 6 has an order of +, +, −, −. This order is changed according to the order(n) and repetition(m). In this way, the information of the input image in all the four quadrants is concentrated in the first quadrant. Thus, it is possible to rapidly obtain a Zernike moment by multiplying the information in the first quadrant by the Zernike moment basis function.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

As described above in detail, it is possible to extract a Zernike/Pseudo-Zernike moment in real time according to the embodiments of the present invention.

In addition, in the present invention, system loads can be reduced more substantially by decreasing memory utilization during moment extraction to ¼, as compared to the conventional art.

What is claimed is:

1. A method for extracting a Zernike/Pseudo-Zernike moment for an input image, comprising:
    generating a Zernike/Pseudo-Zernike moment basis function in a predetermined quadrant on plane Cartesian coordinates based on a symmetry of a Zernike/Pseudo-Zernike moment in the plane Cartesian coordinates;
    obtaining a pixel value of the input image by projecting the input image onto the quadrant; and
    multiplying each pixel value of the input image by the moment basis function corresponding to the pixel position and then summing the results thereof.

2. The method according to claim 1, wherein generating the moment basis function comprises:
    obtaining a moment radial polynomial according to a change in order and repetition and checking if the repetition is an even number;
    generating the Zernike/Pseudo-Zernike moment basis function in the quadrant by using a symmetry of a linear function passing the origin and having an absolute value of its slope of 1, if the repetition is an even number; and
    generating the Zernike/Pseudo-Zernike moment basis function in the quadrant without using the symmetry, if the repetition is an odd number.

3. The method according to claim 1, wherein obtaining the pixel value of the input image comprises:
    adjusting the input image to a size of the Zernike/Pseudo-Zernike moment basis function; and
    obtaining the pixel value of the input image by projecting the input image of which the size is adjusted onto the quadrant by using x-axis symmetry, y-axis symmetry, and origin symmetry.

4. The method according to claim 1, wherein the predetermined quadrant is a first quadrant.

5. The method according to claim 2, wherein the linear function passes the origin and has a slope of +1.

6. A method for extracting a Zernike/Pseudo-Zernike moment for an input image, comprising:
    generating a Zernike/Pseudo-Zernike moment basis function in a predetermined quadrant on plane orthogonal coordinates;
    generating a Zernike/Pseudo-Zernike moment for all quadrants from the Zernike/Pseudo-Zernike moment basis function on the quadrant by a symmetry of a Zernike/Pseudo-Zernike moment;
    obtaining a pixel value of the input image; and
    multiplying each pixel value of the input image with the moment basis function corresponding to the pixel position and then summing the results thereof.

7. The method according to claim 6, wherein generating the moment basis function comprises:
    obtaining a moment radial polynomial according to a change in order and repetition and checking if the repetition is an even number;
    generating the Zernike/Pseudo-Zernike moment basis function in the quadrant by using a symmetry of a linear function passing the origin and having an absolute value of its slope of 1, if the repetition is an even number; and
    generating the Zernike/Pseudo-Zernike moment basis function in the quadrant without using the symmetry, if the repetition is an odd number.

8. The method according to claim 6, wherein the symmetry of the Zernike/Pseudo-Zernike moment basis function is the symmetry of x-axis, y-axis, and origin.

9. A computer readable recording medium on which a program implementing the same method is recorded, comprising
    generating a Zernike/Pseudo-Zernike moment basis function of an input image in a predetermined quadrant on plane orthogonal coordinates in an image recognition system having a processor in order to extract a Zernike/Pseudo-Zernike moment based on a symmetry of a Zernike/Pseudo-Zernike moment in the plane orthogonal coordinates;
    obtaining a pixel value of the input image by projecting the input image onto the quadrant; and
    multiplying each pixel value of the input image with the moment basis function corresponding to the pixel position and then summing the results thereof.

10. A computer readable recording medium on which a program implementing the same method is recorded, comprising:
    generating a Zernike/Pseudo-Zernike moment basis function of an input image in a predetermined quadrant on plane orthogonal coordinates in an image recognition system having a processor in order to extract a Zernike/Pseudo-Zernike moment;

generating a Zernike/Pseudo-Zernike moment for all quadrants from the Zernike/Pseudo-Zernike moment basis function on the quadrant by using a symmetry of a Zernike/Pseudo-Zernike moment;

obtaining a pixel value of the input image; and multiplying each pixel value of the input image with the moment basis function corresponding to the pixel position and then summing the results thereof.

11. A method for extracting a Zernike/Pseudo-Zernike moment for an input image, comprising:

generating a Zernike/Pseudo-Zernike moment basis function in a predetermined quadrant on plane Cartesian coordinates by obtaining a moment radial polynomial according to a change in order and repetition and checking if the repetition is an even number, generating the Zernike/Pseudo-Zernike moment basis function in the quadrant by using a symmetry of a linear function passing the origin and having an absolute value of its slope of 1, if the repetition is an even number, and generating the Zernike/Pseudo-Zernike moment basis function in the quadrant without using the symmetry, if the repetition is an odd number.

12. The method according to claim 11, further comprising:

obtaining a pixel value of the input image by projecting the input image onto the quadrant; and multiplying each pixel value of the input image by the moment basis function corresponding to the pixel position and then summing the results thereof.

13. The method according to claim 12, wherein the linear function passes the origin and has a slope of +1.

14. The method according to claim 11, wherein obtaining the pixel value of the input image comprises:

adjusting the input image to a size of the Zernike/Pseudo-Zernike moment basis function; and obtaining the pixel value of the input image by projecting the input image of which the size is adjusted onto the quadrant by using x-axis symmetry, y-axis symmetry, and origin symmetry.

15. The method according to claim 11, wherein the predetermined quadrant is a first quadrant.

* * * * *

UNITED STATES PATENT AND TRADEMARK OFFICE
CERTIFICATE OF CORRECTION

PATENT NO. : 6,941,015 B1
DATED : September 6, 2005
INVENTOR(S) : Hoei Wyul Kim and Sun Kyoo Hwang It is certified that error appears in the above-identified patent and that said Letters Patent is hereby corrected as shown below:

<u>Title page,</u>
Item [75], Inventor, should read -- Hoei Wyul Kim --.

Signed and Sealed this

Fourth Day of April, 2006

JON W. DUDAS
*Director of the United States Patent and Trademark Office*